(12) United States Patent
Ishii et al.

(10) Patent No.: US 7,585,243 B2
(45) Date of Patent: Sep. 8, 2009

(54) AUTOMATIC TRANSMISSION

(75) Inventors: Katsuhisa Ishii, Okajoki (JP); Minoru Todo, Takahama (JP); Mikio Iwase, Anjo (JP); Takuya Nakajima, Toyota (JP); Hirofumi Ota, Toyota (JP); Kazutoshi Nozaki, Aichi-ken (JP); Atsushi Honda, Seto (JP); Masafumi Kinoshita, Toyota (JP)

(73) Assignees: Aisin AW Co., Ltd. (JP); Toyota Jidosha Kabushiki Kaisha (JP)

( * ) Notice: Subject to any disclaimer, the term of this patent is extended or adjusted under 35 U.S.C. 154(b) by 437 days.

(21) Appl. No.: 11/600,051

(22) Filed: Nov. 16, 2006

(65) Prior Publication Data

US 2007/0155568 A1    Jul. 5, 2007

(30) Foreign Application Priority Data

| Nov. 17, 2005 | (JP) | ............................. 2005-333338 |
| Nov. 17, 2005 | (JP) | ............................. 2005-333383 |
| Nov. 17, 2005 | (JP) | ............................. 2005-333385 |
| Nov. 17, 2005 | (JP) | ............................. 2005-333442 |

(51) Int. Cl.
*F16H 63/02* (2006.01)
(52) U.S. Cl. ........................... 475/146; 475/331; 74/335
(58) Field of Classification Search ................. 475/146, 475/311, 316
See application file for complete search history.

(56) References Cited

U.S. PATENT DOCUMENTS

| 3,747,730 | A | * | 7/1973 | Hause ..................... 192/87.11 |
| 3,963,283 | A | * | 6/1976 | De Feo et al. ............... 384/276 |
| 5,403,171 | A | * | 4/1995 | Sugita et al. ............... 418/55.1 |
| 5,691,681 | A | * | 11/1997 | Okugawa ..................... 335/284 |
| 5,899,461 | A | | 5/1999 | Yomogita .................... 277/559 |
| 6,135,912 | A | | 10/2000 | Tsukamoto et al. .......... 475/271 |
| 6,445,099 | B1 | * | 9/2002 | Roseman ...................... 310/90 |
| 6,601,683 | B1 | * | 8/2003 | Givan et al. ............. 192/107 M |
| 6,860,829 | B2 | * | 3/2005 | Bock et al. .................... 475/18 |
| 7,232,022 | B2 | | 6/2007 | Aoki et al. ................... 192/106 |

FOREIGN PATENT DOCUMENTS

| JP | 02-008540 | 1/1990 |
| JP | 02-093152 | 4/1990 |
| JP | 02-125131 | 5/1990 |
| JP | 02-129445 | 5/1990 |
| JP | 02-129457 | 5/1990 |
| JP | 05-039866 | 2/1993 |
| JP | 09-210088 | 8/1997 |
| JP | 2003-287090 | 10/2003 |

* cited by examiner

*Primary Examiner*—Sherry Estremsky
(74) *Attorney, Agent, or Firm*—Bacon & Thomas, PLLC

(57) ABSTRACT

The present invention provides an automatic transmission having a main bearing disposed between the inner surface of a boss portion of a first drum and the outer surface of a cylindrical support, for rotatably supporting the first drum. An auxiliary bearing is press-fit into one end of the interior of the boss portion of the first drum and surrounds the cylindrical support with an annular gap therebetween. The auxiliary bearing contacts the cylindrical support only when the first drum tilts relative to the central axis of the transmission, and has a shorter axial length than that of the main bearing.

6 Claims, 3 Drawing Sheets

|  | C-1 | C-2 | C-3 | C-4 | B-1 | B-2 | F-1 |
|---|---|---|---|---|---|---|---|
| P |  |  |  |  |  |  |  |
| REV1 |  |  | O |  |  | O |  |
| REV2 |  |  |  | O |  | O |  |
| N |  |  |  |  |  |  |  |
| 1ST | O |  |  |  |  | (O) | O |
| 2ND | O |  |  |  | O |  |  |
| 3RD | O |  | O |  |  |  |  |
| 4TH | O |  |  | O |  |  |  |
| 5TH | O | O |  |  |  |  |  |
| 6TH |  | O |  | O |  |  |  |
| 7TH |  | O | O |  |  |  |  |
| 8TH |  | O |  |  | O |  |  |

AUTOMATIC TRANSMISSION

INCORPORATION BY REFERENCE

The disclosure of Japanese Patent Application No. 2005-333383 filed on Nov. 17, 2005, including the specification, drawings and abstract is incorporated herein by reference in its entirety.

BACKGROUND OF THE INVENTION

1. Field of the Invention

The present invention relates to an automatic transmission, and more particularly to an automatic transmission in which a drum is supported by only one bearing in normal operation, and another bearing is caused to function as a bearing only in response to an abnormal external force.

2. Description of the Related Art

An automatic transmission typically includes a speed change mechanism for shifting between a plurality of speeds by engaging and disengaging a clutch and a brake. Such automatic transmissions are provided with two or more clutches, each clutch including a drum, a piston, a canceller, etc.

In this type of automatic transmission, bearing(s) rotatably support the clutch drum at one point or at both ends, i.e. at two points. When support is provided at only one point, the axial length of the bearing must be considerably increased to ensure that the drum will not tilt excessively upon application of an external force. On the other hand, when support is provided at two points, the two bearings must each have a sufficient axial length to ensure sufficient durability.

Therefore, in a conventional automatic transmission, a bearing having a large axial dimension is disposed at the end of a passage for supplying pressure oil, irrespective of whether support is provided at one point or two, thus requiring lengthening of the axial dimension of the drum, making it difficult to reduce the weight and size of the drum, and, by extension, making it difficult to reduce the size and weight of the automatic transmission.

SUMMARY OF THE INVENTION

Accordingly, the present invention has as an objective provision of an automatic transmission which is reduced in weight and made more compact by minimizing the axial length of an auxiliary bearing.

More specifically, the present invention provides an automatic transmission having a main bearing disposed between an inner cylindrical surface of a boss of a first drum and an outer surface of a cylindrical support, for rotatably supporting the first drum, and an auxiliary bearing press-fit into one end of the inner cylindrical surface of the boss of the first drum, with an annular gap between it and the cylindrical support portion in normal operation. The auxiliary bearing comes into contact with the cylindrical support only when the first drum tilts in response to an external force, and has a shorter axial length than the main bearing. Since the auxiliary bearing supports the first drum only as required, such as when the first drum tilts, it does not need to be as durable as the main bearing and can have a minimum axial length. As a result, the axial dimension of the first drum can be minimized.

In a second aspect the present invention provides a speed change mechanism including a first working oil supply passage formed in a boss portion of the transmission case, and a first working oil supply hole formed in the boss of the first drum for supply of working oil to a first cylinder chamber. Thus, the working oil flows through the first working oil supply passage and the first working oil supply hole via a pair of sealing rings disposed on the boss portion of the transmission case. Since the first drum is supported by the auxiliary bearing when the first drum tilts relative to the central axis of the transmission (relative to the direction of travel of the vehicle), breaking of the seal provided by the sealing rings forming the working oil supply passage to the first cylinder chamber due to the tilting of the first drum can be prevented. As a result, oil leakage past the sealing rings can be prevented, and the control function of a first hydraulic servo is not comprised, i.e., not reduced.

In a third aspect, the present invention provides an automatic transmission wherein the first drum opens toward the rear of the vehicle, wherein the first drum and the second drum are coupled together for integral rotation by splined engagement of first spline teeth formed on the outer surface of a rear portion of the boss of the first drum, and second spline teeth formed on an inner cylindrical surface of a boss of the second drum. Working oil is supplied to a second cylinder chamber through a second working oil supply passage and a second working oil supply hole via the pair of sealing rings disposed on the boss portion of the transmission case, and through the second working oil supply hole and a third working oil supply hole via a pair of sealing rings disposed between the boss of the first drum and the boss of the second drum. Thus, the working oil must be supplied to the second cylinder chamber via the first drum. Although the first drum must be sufficiently sized to accommodate the spline connection and the sealing rings, due to the fact that the first drum is normally supported only by the main bearing, with simultaneous support by the auxiliary bearing only when the first drum tilts, the first drum, and consequently the entire transmission, can be made more compact.

According to a fourth aspect, the automatic transmission has the main bearing formed as a metal bush and, in so doing, a sufficient axial length for rotatably supporting the drum easily realized.

DETAILED DESCRIPTION OF THE PREFERRED EMBODIMENTS

Figures 1, 2:
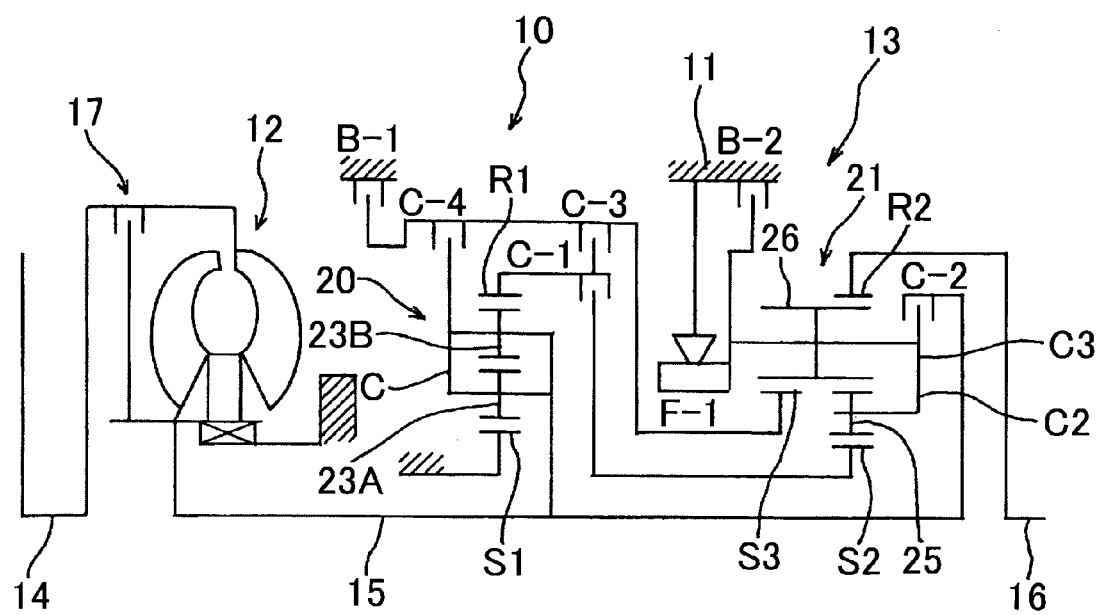
FIG. 1 is a skeletal diagram of an automatic transmission according to the present invention.
FIG. 2 is a chart of the engagement states of brakes and clutches in each gear speed of the automatic transmission shown in FIG. 1.

An embodiment of the present invention is described below with reference of the drawings. FIG. 1 shows an automatic transmission 10 which is suitable for use in a front wheel or rear wheel drive type vehicle. The automatic transmission 10 is provided with a torque converter 12 and a speed change mechanism 13, both mounted in a transmission case 11 attached to a vehicle body. Output from the engine is input to an input shaft 15 of the automatic transmission 10 via the pump impeller and a turbine of the torque converter 12. The speed change mechanism 13 changes the speed of rotation input from the input shaft 15 and outputs the rotation at an output shaft 16 connected to a driven wheel. The torque converter 12 is provided with a lock-up clutch 17. Further, the input shaft 15 and output shaft 16 of the automatic transmission 10 are coaxial and aligned front to back of the vehicle. The torque converter 12 is disposed on the front end side of the transmission, while the output shaft 16 is disposed on the rear end side of the transmission. Thus, in the description which follows the torque converter 12 end of the automatic transmission 10 will be referred to as the "front", and the output shaft 16 end will be referred to as the "rear".

The speed change mechanism 13 is formed of the input shaft 15, a speed reducing planetary gear set 20, a planetary gearing set 21, including a plurality of planetary subsets, the output shaft 16, first through fourth clutches C-1 to C-4, and first and second brakes B-1, B-2, which are supported in series coaxially within the transmission case 11.

The speed reducing planetary gear set 20, which reduces the rotational speed of the input shaft 15 and transfers the rotation to a reduced speed rotary member, includes a sun gear S1 which is fixed to the transmission case 11 and thereby rotationally restricted, a carrier C1 which is directly coupled to the input shaft 15, a first pinion 23A which is supported by the carrier C1 and which meshes with the sun gear S1, a second pinion 23B which is supported by the carrier C1 and which meshes with the first pinion 23A, and a ring gear R1 which meshes with the second pinion 23B.

The planetary gear set 21 is a Ravigneaux type gear set combining a single pinion planetary gear subset and a double pinion planetary gear subset, for example.

A small diameter first sun gear S2 of the planetary gear set 21 is selectively connected to the ring gear R1 of the speed reducing planetary gear set 20 by the first clutch C-1. A large diameter second sun gear S3 is selectively connected to the ring gear R1 of the speed reducing planetary gear set 20 by the third clutch C-3, and selectively connected to the input shaft 15, via the carrier C1 of the speed reducing planetary gear set 20, by the fourth clutch C-4. A short pinion 25 meshes with the first sun gear S2 and a long pinion 26 meshes with the second sun gear S3 and the short pinion 25. The short pinion 25 and long pinion 26 are each rotatably supported by directly coupled carriers C2, C3. A ring gear R2 meshes with the long pinion 26 and is connected to the output shaft 16 serving as an output element.

The second sun gear S3 is selectively connected to the transmission case 11 by the first brake B-1. The carrier C2 (C3) is selectively connected to the input shaft 15 by the second clutch C-2. The carrier C2 (C3) is also selectively connected to the transmission case 11 by the second brake B-2, and can be rotationally restricted by engagement of a one-way clutch F-1.

The automatic transmission 10 as described above is capable of establishing gear ratios for eight forward speeds and two reverse speeds by selectively engaging and disengaging the first through fourth clutches C-1 to C-4 and the first and second brakes B-1, B-2, for selectively connecting or fixing the input shaft 15, the output shaft 16, and the various elements of the speed reducing planetary gear sets 20 and 21. In FIG. 2, the circles in the clutch and brake columns indicate that the clutch or brake is in an engaged state, and absence of a circle indicates a disengaged state.

Operation in each gear speed will now be described. When in P (parking) or N (neutral), all of the clutches C-1 to C-4 and brakes B-1, B-2 are released, and therefore there is no power transfer between the input shaft 15 and output shaft 16.

In the first forward speed, as shown in FIG. 2, the first clutch C-1 is engaged and the one-way clutch F-1 is engaged so that the reduced speed of rotation of the ring gear R1, in the speed reducing planetary gear set 20, is input into the first sun gear S2 of the planetary gear set 21 via the first clutch C-1. The reduced speed of rotation of the first sun gear S2 is then further reduced by the carrier C2 (C3), the rotation of which is restricted to a single direction by the one-way clutch F-1, and input into the ring gear R2, whereby the output shaft 16 is positively rotated at a reduced speed, i.e. a first speed gear ratio. Note that during engine braking, the second brake B-2 is engaged instead of the one-way clutch F-1 and the carrier C2 (C3) is held stationary.

In the second forward speed, the first clutch C-1 and the first brake B-1 are engaged. As a result, the reduced speed rotation of the ring gear R1 in the speed reducing planetary gear set 20 is input into the first sun gear S2 via the first clutch C-1, and since the second sun gear S3 is fixed by the first brake B-1, the ring gear R2 is positively rotated at a reduced speed for output of the second speed at the output shaft 16.

In the third forward speed, the first and third clutches C-1, C-3 are engaged. As a result, the reduced speed of rotation of the ring gear R1 in the speed reducing planetary gear set 20 is input into the first sun gear S2 via the first clutch C-1 and input into the second sun gear S3 via the third clutch C-3. Accordingly, the planetary gear set 21 rotates integrally, and the ring gear R2 is positively rotated at a reduced speed, relative to the speed of rotation of the input shaft 15, by the speed reducing planetary gear set 20, for output of the third speed at the output shaft 16.

In the fourth forward speed, the first and fourth clutches C-1, C-4 are engaged. As a result, the reduced speed rotation of the ring gear R1 in the speed reducing planetary gear set 20 is input to the first sun gear S2 via the first clutch C-1, and the rotation of the carrier C1 in the speed reducing planetary gear set 20 is input to the second sun gear S3 via the fourth clutch C-4. Thus, the ring gear R2 is positively rotated for output of fourth speed at the output shaft 16.

In the fifth forward speed, the first and second clutches C-1, C-2 are engaged. As a result, the reduced speed of rotation of the ring gear R1 is input to the first sun gear S2 via the first clutch C-1, and the rotation of the input shaft 15 is input into the carriers C2, C3, which are directly coupled via the second clutch C-2. Thus, the ring gear R2 is positively rotated at a reduced speed for output of the fifth speed at the output shaft 16.

In the sixth forward speed, the second and fourth clutches C-2, C-4 are engaged. As a result, the rotation of the input shaft 15 is input to the second sun gear S3 via the fourth clutch C-4 and the carrier C1 of the speed reducing planetary gear set 20. The rotation of the input shaft 15 is also input into the carriers C2, C3, which are directly coupled via the second clutch C-2. Thus, the planetary gear set 21 rotates integrally with the input shaft 15, and the ring gear R2 is positively rotated for output of sixth speed at the output shaft 16.

In the seventh forward speed, the second and third clutches C-2, C-3 are engaged, whereby the rotation of the input shaft 15 is input to the carriers C2, C3, which are directly coupled via the second clutch C-2, and the reduced speed rotation of the ring gear R1 is input to the second sun gear S3 via the third clutch C-3. Thus, the ring gear R2 is positively rotated at an increased speed for output of seventh speed at the output shaft 16.

In the eighth forward speed, the second clutch C-2 and the first brake B-1 are engaged for input of the rotation of the input shaft 15 into the carriers C2, C3, which are directly coupled via the second clutch C-2. Further, the second sun gear S3 is fixed by the first brake B-1. Thus, the ring gear R2 is positively rotated at an increased speed for output of eighth speed at the output shaft 16.

In the first reverse speed, the third clutch C-3 and the second brake B-2 are engaged so that the rotation of the input shaft 15 is input into the second sun gear S3 via the third clutch C-3, and the directly coupled carriers C2, C3 are fixed by the second brake B-2. Thus, the ring gear R2 is rotated in reverse at a reduced speed for output of first reverse speed gear at the output shaft 16.

In the second reverse speed, the fourth clutch C-4 and the second brake B-2 are engaged. As a result, the rotation of the input shaft 15 is input into the via the carrier C1 and the fourth clutch C-4, while the directly coupled carriers C2, C3 are fixed by the second brake B-2. Thus, the ring gear R2 is rotated in reverse at a reduced speed for output of second reverse speed at the output shaft 16.

Figure 3:
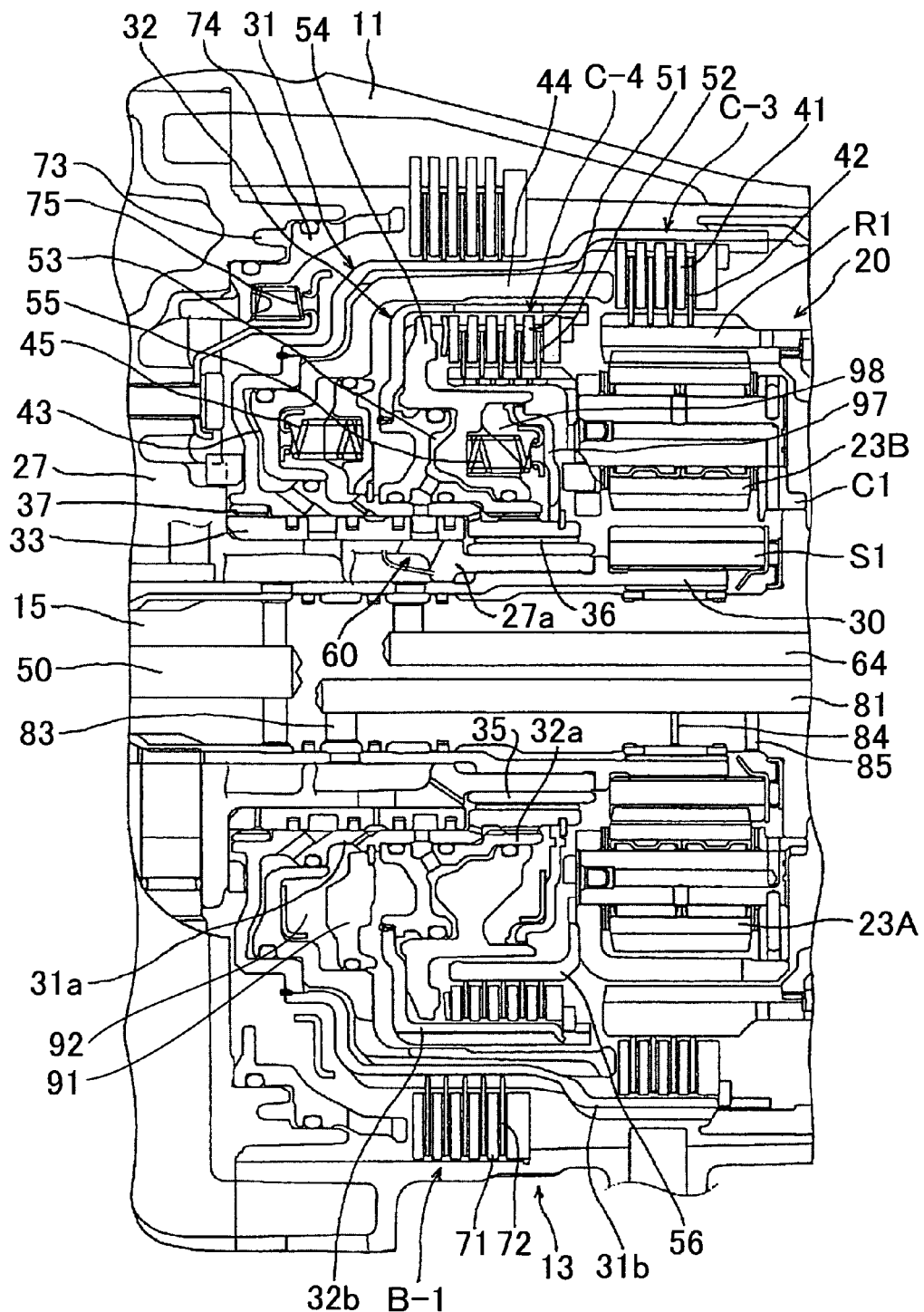
FIG. 3 is a partial sectional view showing a lubricating device of the automatic transmission according to an embodiment of the present invention.
Figure 4:
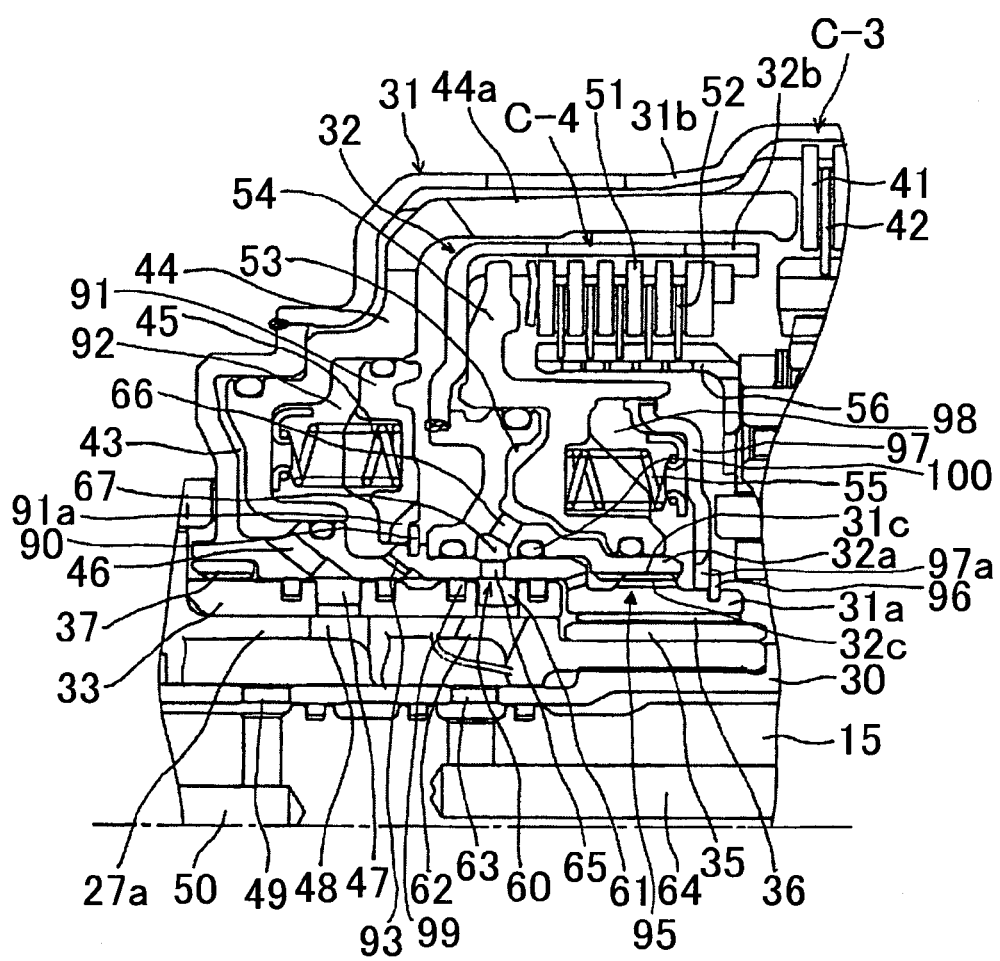
FIG. 4 is a partial enlargement of FIG. 3.

FIGS. 3 and 4 more specifically show the structure of the speed reducing planetary gear set 20, the third and fourth clutches C-3, C4, and the first brake B-1. As shown in FIGS. 3 and 4, the input shaft 15 is rotatably supported by the transmission case 11, and an oil pump body 27 is fixed to the transmission case 11 and to a stator shaft 30. The stator shaft 30 is press-fit into the interior of a boss portion 27a of the oil pump body 27. The speed reducing planetary gear set 20 is disposed on the outer surface of a rear end portion of the stator shaft 30, and the sun gear S1 of the speed reducing planetary gear set 20 is held against rotation by spline engagement.

The third clutch C-3 has a first drum 31 of a closed-end cylindrical shape, and the fourth clutch C-4 has a second drum 32, also having a closed-end cylindrical shape, both housed in the transmission case 11. The fourth clutch C-4 is accommodated within the interior of the first drum 31. The first drum 31 is rotatably supported on the outer surface of a sleeve member 33 which is fit over the outer periphery of the boss portion 27a of the oil pump body 27. The second drum 32 is supported by a boss 31a and extends coaxially within the first drum 31. Further, the second drum 32 is engaged with the first drum 31 by splined portion 95, for rotation integral therewith.

A plurality of sealing members are interposed between the inner cylindrical surface of the boss portion 31a of the first drum 31 and the outer cylindrical surface of the sleeve member 33. The rear (distal) end of the boss portion 31a is rotatably supported by a metal bush-shaped main bearing 36, which is disposed on a fixing sleeve 35 fitted onto the outer surface of the rear (distal) end of the boss portion 27a of the oil pump body 27. The main bearing 36 has a sufficient axial length so that it alone rotatably supports the first drum 31.

Further, a metal bush-shaped auxiliary bearing 37, having a shorter axial length than the main bearing 36, is press-fit within the (the front side end) of the boss portion 31a. The auxiliary bearing 37 surrounds the outer surface of the sleeve member 33 with a gap therebetween, and does not function as a bearing in normal operation. The auxiliary bearing 37 contacts the outer periphery of the sleeve member 33 to function as a bearing only when an incline-related force such as a gyroscopic moment is applied to the first drum 31 such that the first drum 31 tilts to or beyond a predetermined angle of inclination relative to the direction of forward travel of the vehicle. Thus, the size of the auxiliary bearing 37 can be reduced to less than that of a bearing in a conventional transmission in which the drum is supported at two points at all times, and accordingly, the axial length thereof can be minimized. Hence, the bearing surface of the first drum 31, on which the auxiliary bearing 37 is mounted can be shortened, thereby reducing the axial dimension of the first drum 31.

The open end (cylindrical portion) 31b of the first drum 31 is selectively connected to (engaged with) the ring gear R1 of the speed reducing planetary gear set 20 via the third clutch C-3. The third clutch C-3 is formed of friction engagement elements including separator plates which are splined to the inner surface of cylindrical 31b portion and friction plates 42 which are splined to the ring gear R1, and a first hydraulic servo. The first hydraulic servo includes a first piston 44, which is slidably mounted within a first cylinder chamber 43 formed in the bottom portion of the first drum 31, a canceller plate 91 disposed on the boss 31a of the first drum 31, and a return spring 45 which biases the first piston 44 toward the bottom portion of the first drum 31.

An inner peripheral edge of the canceller plate 91 is latched around the outer periphery of the boss 31a of the first drum 31 with its movement in one axial direction limited by a snap ring 90. The outer peripheral edge of the canceller plate 91 slidably engages the inner cylindrical surface of the first piston 44 with a liquid-tight seal, and a first cancel chamber 92 is formed between the canceller plate 91 and the first piston 44. The return spring 45, which urges the first piston 44 in the axial direction which disengages the third clutch C-3, is disposed between the canceller plate 91 and first piston 44.

The first cancel chamber 92 is supplied with cancel oil (operating fluid) through a cancel oil supply hole 93 extending through the radial dimension of the boss 27a of the oil pump body 27, the sleeve member 33, and the first drum 31. The cancel oil supplied to the first cancel chamber 92 is discharged through a cancel oil discharge groove 91a formed in the inner peripheral edge of the canceller plate 91. The first cancel chamber 92 acts to cancel centrifugal oil pressure in the first cylinder chamber 43.

The first piston 44 is coaxial with the first drum 31 and includes a skirt which extends along the inner cylindrical surface of the first drum 31, and the open (edge) of the skirt engages the one side of the friction engagement elements of the third clutch C-3. The first cylinder chamber 43 of the hydraulic servo is defined between the bottom wall of first drum 31 and first piston 44. The first cylinder chamber 43 communicates with an oil passage formed in the boss portion 27a of the oil pump body 27 via a supply passage 47 formed by oil holes in the boss portion 31a of the first drum 31 and the sleeve member 33. The oil passage formed in the boss portion 27a is connected to an oil pressure control device, not shown in the drawings, and as a result of pressure oil supplied by the oil pressure control device, the first piston 44 moves against the spring force of the return spring 45 so as to engage the friction engagement elements of the third clutch C-3. When the supply of oil pressure is stopped, the third clutch C-3 is released by the spring force of the return spring 45.

The second drum 32 is disposed radially inward of both the first piston 44 and the third clutch C-3. The second drum 32 includes an inner boss portion 32a disposed coaxially within the boss 31a of the first drum 31 and an outer cylindrical portion 32b. As shown in FIG. 4, splines 32c are formed on the inner surface of a rear side end portion of the boss portion 32a of the second drum 32. The splines 32c are engaged with splines 31c formed on the outer surface of a rear side end portion of the boss portion 31a of the first drum 31 to form the spline engagement section 95.

The open side (rear side) end of the outer cylindrical portion 32b of the second drum 32 is selectively engaged with the carrier C1 of the speed reducing planetary gear set 20 via the fourth clutch C-4. The fourth clutch C-4 includes separator plates 51 which are splined to the inner surface of the outer cylindrical portion 32b and friction plates 52 which are splined to the outer surface of a clutch hub 56 coupled to the carrier C1. The fourth clutch C-4 is operated by a second hydraulic servo which includes a second piston 54, slidably mounted within a second cylinder chamber 53 formed in the bottom portion of the second drum 32, a canceller plate 97 disposed on the boss portion 31a of the first drum 31, and a return spring 55 which biases the second piston 54 forward for disengagement of the clutch C-4. A distal end of a radially outward engaging portion of the second piston 54 is splined to the interior surface of the outer cylindrical portion 32b of the second drum 32 and is axially spaced to the front of the fourth clutch C-3. The second piston 54 is supported on the outer surface of the boss portion 32a of the second drum 32.

The canceller plate 97 is disposed on the rear side end of the boss portion 31a of the first drum 31, with movement thereof in one axial direction limited by a snap ring 96. The radially outer edge of the canceller plate 97 is fitted within a skirt portion of the second piston 54 to form a second cancel chamber 98 between the canceller plate 97 and the second piston 54. The return spring 55, which urges the second piston 54 in the axial direction disengaging the fourth clutch C-4, is disposed between the canceller plate 97 and the second piston 54.

The third clutch C-3 is formed of separator plates 41, friction plates 22 and a return spring 45, and is operated by a hydraulic servo formed by the first drum 31 and the first piston 44. The first piston 44 and the third clutch C-3 are housed within the first drum 31.

Similarly, the fourth clutch C-4 is formed of separator plates 51, friction plates 52 interleaved with the separator plates 51 and a return spring 55, and is operated by a hydraulic servo formed by the second drum 32 and the second piston 54. The fourth clutch C-4 and the second piston 54 are housed within the second drum 32.

An oil supply passage 60 is constituted by a plurality of second working oil supply holes 65 radially formed in the boss portion 31a of the first drum 31 at circumferentially equiangular positions, a plurality of third working (operating) oil supply holes 66 radially formed in the boss 32a of the second drum 32 at circumferentially equiangular spaced positions, and an annular oil passage 67 formed between the two boss portions 31a, 32a. The second and third working oil supply holes 65, 66 communicate with each other via the annular oil passage 67. A pair of sealing rings 99 are disposed on the sleeve member 33 on axially opposite sides of the second working oil supply holes 65. Also, sealing rings (O rings) 100 are disposed on the boss portion 31a of the first drum 31 on axially opposite sides of the second and third working oil supply holes 65, 66 so as to form the annular oil passage 67.

The outer surface of the outer cylindrical portion 31b of the first drum 31 is selectively connected to the transmission case 11 via the first brake B-1. The first brake B-1 is formed by friction engagement elements including separator plates 71 which are spline-engaged with the inner surface of the transmission case 11 and friction plates 72 which are spline-engaged with the outer surface of the outer cylindrical portion 31b of the first drum 31. The first brake B-1 is operated by a hydraulic servo formed of a piston 74, slidably mounted in an oil chamber 73 formed in the transmission case 11, and a return spring 75 which axially biases the piston 74 toward a position where the first brake B-1 is disengaged.

The free end of a skirt portion of the piston 74 is positioned to engage (axially aligned with) the friction engagement elements of the first brake B-1. The oil chamber 73 of the hydraulic servo is connected to the oil pressure control device via an oil passage or the like, not shown in the drawing, formed in the transmission case 11, and, responsive to oil pressure supplied from the oil pressure control device, the piston 74 slides against the spring force of the return spring 75 so as to engage the first brake B-1. When the supply of oil pressure is stopped, brake B-1 is released by the spring force of the return spring 75.

As shown in FIG. 3, lubricating supply passage 81 is formed in the input shaft 15, and lubricating oil is supplied by an oil pump, not shown in the drawing, to the supply passage 81 via the oil pressure control device and a supply hole 83. A plurality of rows of supply holes 84, 85 communicate with the supply passage 81, and the lubricating oil is supplied to the various portions of the interior of the transmission case 11 through these supply holes 84, 85. The lubricating oil supplied to the interior of the transmission case 11 is dispersed radially outward by centrifugal force, and thereby supplied to various locations where it is need for lubrication, including the speed reducing planetary gear set 20, the clutches C-3, C4, the brake B-1, and the bearings.

When the third clutch C-3 is engaged, the first drum 31 rotates integrally with the ring gear R1 of the speed reducing planetary gear set 20. Further, when the fourth clutch C-4 is engaged, the first drum 31 rotates integrally together with the second drum 32, and with the carrier C1 of the speed reducing planetary gear set 20. In normal operation, the first drum 31 is rotatably supported on the boss 27a of the oil pump body 27, via the support sleeve 35, by the main bearing 36 alone. In normal operation the auxiliary bearing 37 radially faces the outer surface of the sleeve member 33 with a gap therebetween, and therefore does not function as a bearing.

However, when the vehicle turns to the left or right while the first drum 31 is rotating, the first drum tilts relative to the central axis of the transmission (relative to the direction of advancement of the vehicle) due to a gyroscopic moment. When the external force of axial inclination such as a gyroscopic moment, acts on the first drum 31 such that the first drum 31 tilts at a predetermined angle, the auxiliary bearing 37 contacts the outer surface of the sleeve member 33 so as to function as a bearing. Since the auxiliary bearing 37 functions only occasionally as a bearing, it does not need to be durable, and can therefore have a minimum axial length. Further, since the auxiliary bearing 37 limits the axial inclination of the first drum, breaking of the seal provided by the sealing rings in the oil passage for supplying working oil to the first cylinder chamber 43, which would result in leakage of oil supplied to the first cylinder chamber 43 and loss in the control of the first hydraulic servo, can be prevented.

In the embodiment described above, one end of the boss portion 31a of the first drum 31 is rotatably supported on the sleeve 35, which is fitted on the outer surface of the boss portion 27a of the oil pump body 27, via the metal bush-shaped main bearing 36, and the main bearing 36 has a sufficient axial length to rotatably support the first drum 31 alone. Hence, in normal operation, the first drum 31 can be rotatably supported only on the boss portion 27a of the oil pump body 27 via the main bearing 36. Further, the metal bush-shaped auxiliary bearing 37, having an axial length substantially (significantly) shorter than that of the main bearing 36, is fitted on the inner surface at the other end of the boss portion 31a, and the auxiliary bearing 37 surrounds to the outer periphery of the sleeve member 33 with an annular gap therebetween such that, in normal operation, the auxiliary bearing 37 does not function as a bearing. Hence, the auxiliary bearing 37 need not be as durable as the main bearing, and can have a minimum axial length. As a result, even though the plurality of supply passages for supplying oil pressure to the first and second cylinder chambers 43, 53 of the respective hydraulic servos of the third and fourth clutches C-3, C-4 are provided between the boss portion 31a and the sleeve member 33, the axial length of the first drum 31 and the support for supporting the first drum 31 can be minimized and, accordingly, the automatic transmission can be reduced in weight and made more compact.

In the foregoing embodiment, the automatic transmission is described as capable of establishing gear ratios for eight forward speeds and two reverse speeds, but the present invention is not so limited, and may be applied to any automatic transmission in which lubricating oil is supplied via one clutch to another clutch.

Further, in the embodiment described above the planetary gear set 21 is a Ravigneaux type gear set combining a single pinion planetary gear subset and a double pinion planetary gear subset, but the planetary gear set 21 is not limited to a Ravigneaux type gear set, and any planetary gear set including a plurality of (two or more) planetary gear subsets may be employed.

Moreover, in the embodiment described above, the sleeve member 33 and the support sleeve 35 are each fitted onto the outer surface of the boss 27a of the oil pump body 27 such that one end of the first drum 31 is rotatably supported on the support sleeve 35 via the main bearing 36 and the other end of the first drum 31 carries the auxiliary bearing 37, which is normally radially spaced from the sleeve member 33 with play therebetween. Here, the sleeve member 33 and support sleeve 35 constitute, at least in part, the "cylindrical support". However, the sleeve member 33 and the support sleeve 35 may be omitted, and the first drum 31 may be supported directed on the outer cylindrical surface of boss 27a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission mounted in a vehicle at the rear of an engine, in relation to the direction of forward travel of the vehicle, includes a speed change mechanism for shifting between a plurality of speeds by engaging and disengaging a plurality of clutches and brakes, wherein the speed change mechanism comprises:
   a cylindrical support;
   a first hydraulic servo formed by a first drum and a first piston which together define a first cylinder chamber, for operating one of the plurality of clutches;
   a main bearing mounted between an inner surface of a boss portion of the first drum and an outer surface of the cylindrical support, for rotatably supporting the first drum; and
   an auxiliary bearing press-fit into one end of the inner surface of the boss portion of the first drum and surrounding the cylindrical support with an annular gap therebetween in normal operation, the auxiliary bearing contacting the cylindrical support only when the first drum tilts and having a significantly shorter axial length than the axial length of the main bearing.

2. The automatic transmission according to claim 1, wherein:
   the cylindrical support is a boss portion extending from and integral with a transmission case,
   the speed change mechanism comprises a first working oil supply passage formed in the boss portion of the transmission case, and a first working oil supply hole formed in the boss portion of the first drum, and
   working oil is supplied to the first cylinder chamber through the first working oil supply passage and the first working oil supply hole via a pair of sealing rings disposed on the boss portion of the transmission case.

3. The automatic transmission according to claim 2, wherein the speed change mechanism further comprises:
   a second hydraulic servo including a second cylinder chamber defined between a second drum and a second piston which is slidably mounted on a boss portion of the second drum; and
   a second working oil supply passage formed in the boss portion of the transmission case, a second working oil supply hole formed in the boss portion of the first drum, and a third working oil supply hole formed in the boss portion of the second drum; and
   wherein the first drum is open toward the rear of the vehicle,
   wherein the first drum and the second drum are splined together for integral rotation by spline engagement of first spline teeth formed on an outer surface of a rear end portion of the boss portion of the first drum with second spline teeth formed on an interior surface of the boss portion of the second drum,
   wherein the main bearing is disposed on an interior surface of the rear end portion of the boss portion of the first drum; and
   wherein the working oil is supplied to the second cylinder chamber through the second working oil supply passage and the second working oil supply hole via the pair of sealing rings disposed on the boss portion of the transmission case, and through the second working oil supply hole and the third working oil supply hole via a pair of sealing rings disposed between the boss portion of the first drum and the boss portion of the second drum.

4. The automatic transmission according to claim 3, wherein the main bearing is a metal bushing.

5. The automatic transmission according to claim 2, wherein the main bearing is a metal bushing.

6. The automatic transmission according to claim 1, wherein the main bearing is a metal bushing.

* * * * *